Figure 1:
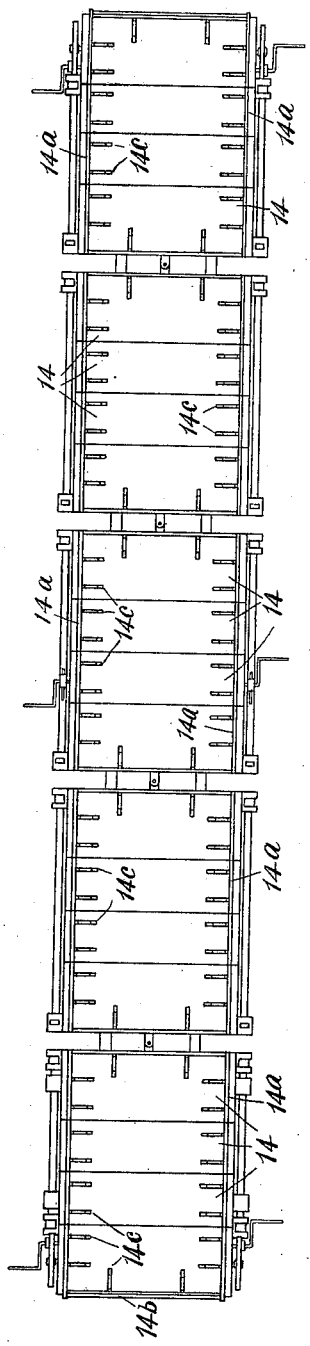

P. R. BANNON.
CONVEYING APPARATUS.
APPLICATION FILED AUG. 8, 1907.

1,030,451.

Patented June 25, 1912.
4 SHEETS—SHEET 1.

Witnesses:
James T. Bannon
C. F. Bassett

Inventor:
Patrick R. Bannon
By Frederick Benjamin
Att'y.

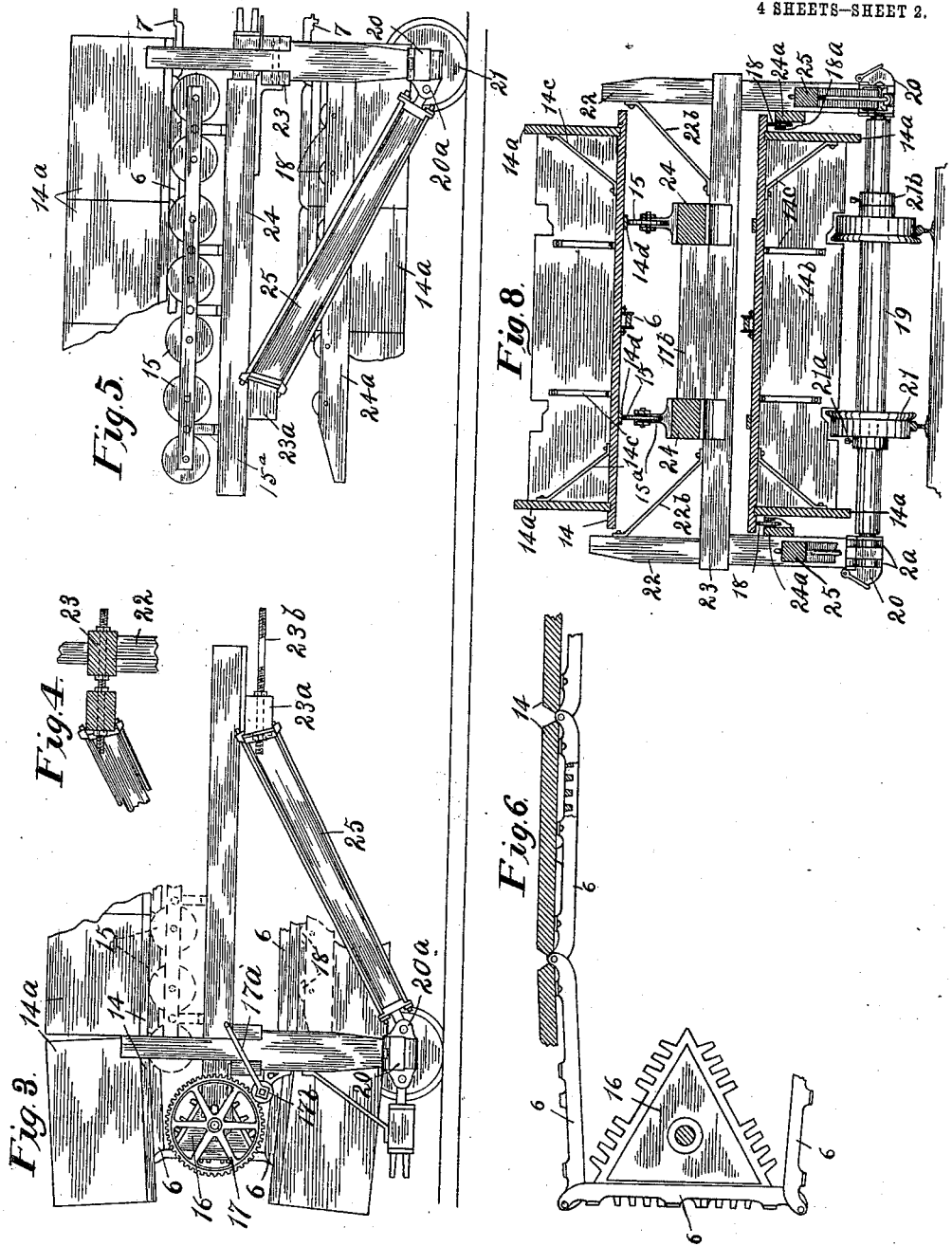

P. R. BANNON.
CONVEYING APPARATUS.
APPLICATION FILED AUG. 8, 1907.

1,030,451.

Patented June 25, 1912.
4 SHEETS—SHEET 4.

Witnesses:
James Bannon
C. F. Bassett

Inventor:
Patrick R. Bannon
By Frederick Benjamin
Att'y.

UNITED STATES PATENT OFFICE.

PATRICK R. BANNON, OF JOLIET, ILLINOIS.

CONVEYING APPARATUS.

1,030,451.  Specification of Letters Patent.  Patented June 25, 1912.

Application filed August 8, 1907. Serial No. 387,599.

*To all whom it may concern:*

Be it known that I, PATRICK R. BANNON, citizen of the United States, residing at Joliet, in the county of Will and State of Illinois, have invented certain new and useful Improvements in Conveying Apparatus, of which the following is a specification.

This invention relates to means for conveying and dumping any suitable materials to form fills or embankments of any kind such as railroad road-beds, breakwaters, etc., and consists generally of a form of endless conveyer mounted in a horizontal position upon a series of flexibly connected trucks supported on suitable ground or track wheels. A load of loose material placed upon the conveyer is dumped at the end of the apparatus where the conveyer is caused to travel over toothed drums, and pulleys, gears or wheels are placed at intervals to afford suitable supports.

The especial objects attained by my invention are: the conveying of a filling material from the source of supply to the point where it is wanted, and dumping it from the end of the apparatus; the loading and unloading of the apparatus from or at a given point, without moving it with respect to that point; the conveying of filling material to the end of a track laid to the edge of a gully, ravine, marsh, etc., and dumping the material over the end of the track, thus forming a fill or foundation upon which the track may be extended and the operation repeated until the work is finished, thus rendering unnecessary the use of trestles, cableways, falsework of any kind, the frequent raising of tracks, and other expensive expedients; to provide an end dump conveyer of the class described in which all of the axles may move independently of each other, that is, may "wind" with respect to each other, thus preventing the wheels from leaving the rails in passing over uneven track. It is a well known fact that the cause of ordinary dump cars leaving the track lies in the rigidity of the car-frames which permits one wheel to be held up entirely clear of the rail while all the weight is upon the remaining three. In the operation of a conveyer embodying my invention it is impossible for one wheel to be held up clear of the rail as will fully appear.

My invention also is intended to provide carrying means that may be loaded or filled at the top in any well known manner, and if desired, may be unloaded at the sides with shovels in the usual way, instead of automatically at one end of the conveyer as especially provided by my invention.

A further object of my invention is to secure a conveying and dumping apparatus that may easily be moved over a track from a point of supply of the filling material to the place where such material is to be utilized.

In this application for patent my improved conveyer is shown mounted on flanged wheels adapted to travel on rails, but it will be apparent that the same principles may be utilized in a similar apparatus equipped with traction wheels. It will also be plain that the supporting beams which constitute the frame upon which the conveyer travels, as well as the conveyer proper will permit of varied treatment as to size, material, shape and arrangement, all within the scope of the essential principles of my invention.

In the accompanying drawings I have shown my invention in a series of views, of which:—

Figure 2:
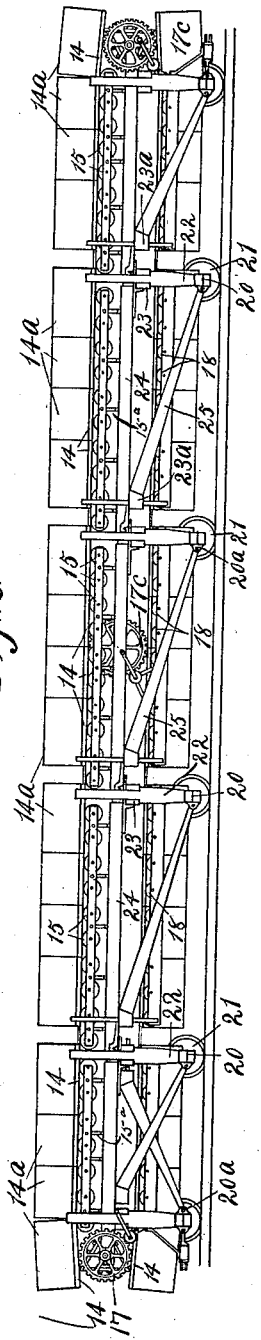
Figure 16:
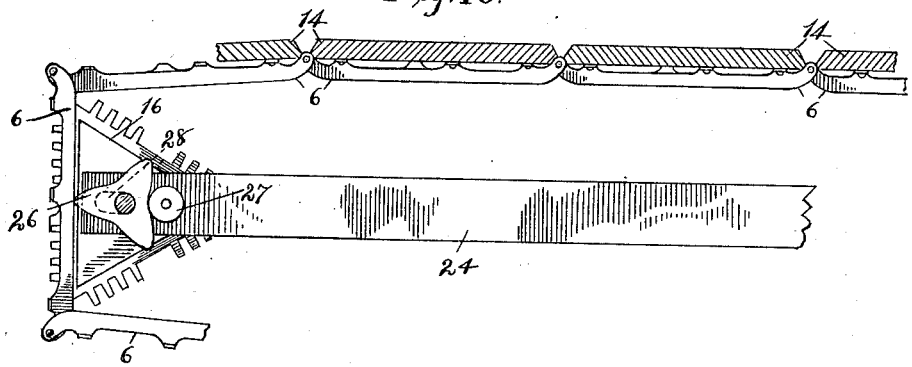
Figure 6A:
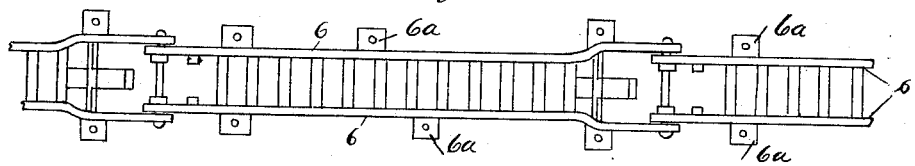
Figure 7:
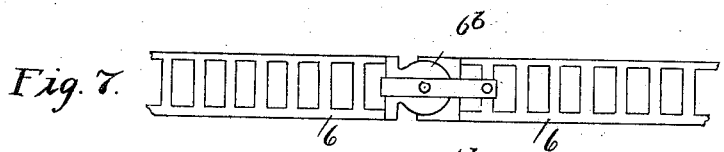
Figure 14:
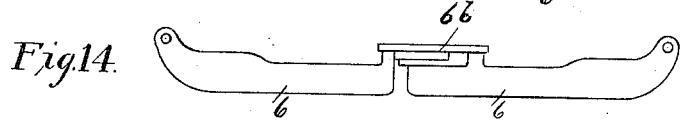
Figure 15:
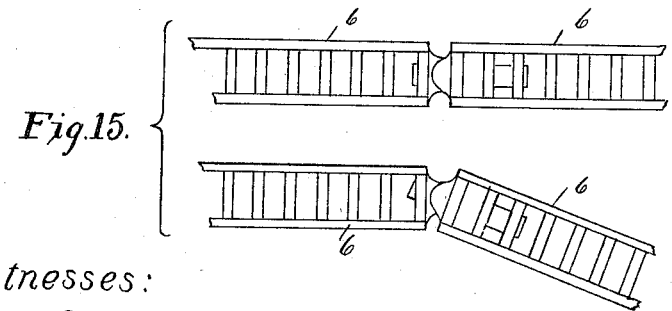
Figure 13:
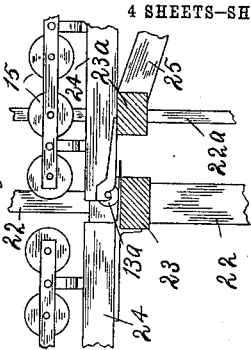
Figure 10:
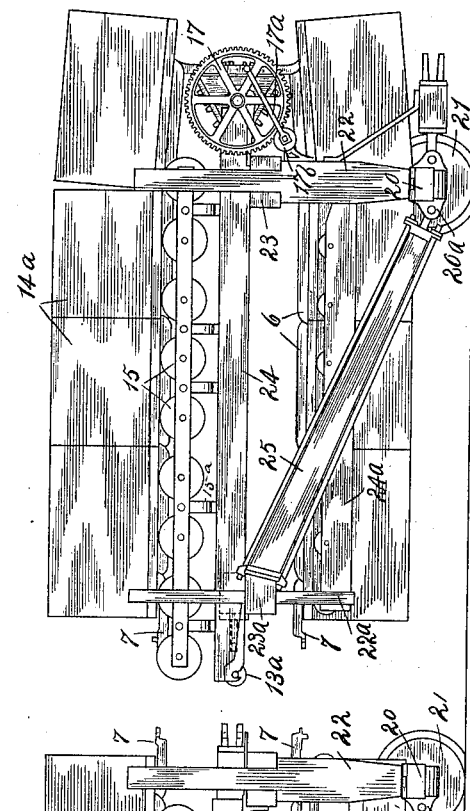
Figure 12:
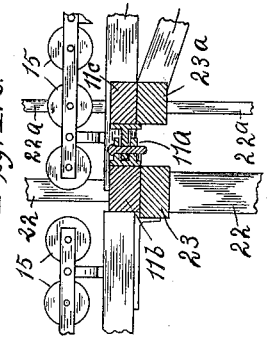
Figure 9:
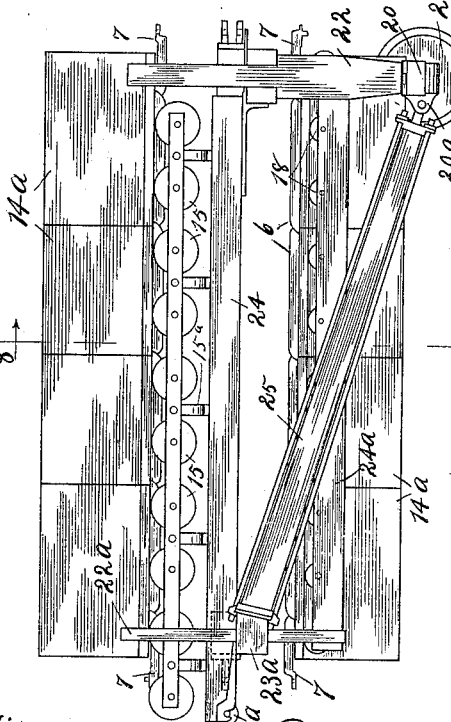
Figure 11:
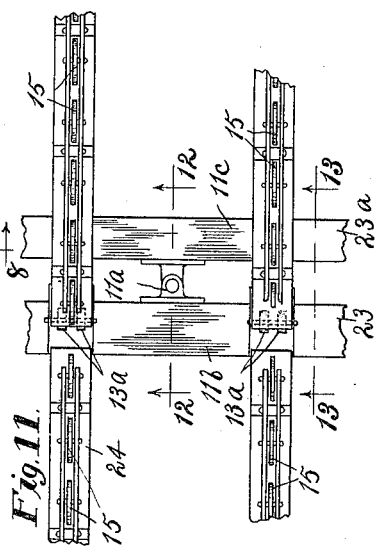

Figure 1 is a top plan view of a conveyer constructed according to my invention; Fig. 2 is a side elevation of the conveyer shown in Fig. 1; Fig. 3 shows a side elevation on a larger scale of the tightener section shown at the left hand of Fig. 2, which forms an important part of my invention; Fig. 4 shows partly in section the operation of the tightener device; Fig. 5 is a side elevation in part of the first intermediate section shown in Fig. 2 coupled with the tightener section; Fig. 6 shows in detail the triangular drum over which the conveyer floor passes at each end of the apparatus, and also a portion of the rack which is secured to the bottom of the floor sections and forms a continuous chain; Fig. 6ᵃ is a plan of a portion of the parts shown in Fig. 6 on an enlarged scale; Fig. 7 shows in detail links of the floor-rack; Fig. 8 is a cross-section at 8—8 of Fig. 9; Fig. 9 is one of the intermediate sections of which the conveyer is mainly composed; Fig. 10 shows in elevation the section used at the end of the apparatus; Fig. 11 is a top plan view of the coupling between two sections and the roller bearing where one rests upon the other; Fig. 12 is a cross-section of the coupling taken at 12—12 of Fig. 11; Fig. 13 is a side elevation of roller bearing between the contiguous end portions of two sections, on the line 13—13 of Fig. 11; Figs. 14 and 15 are details of the rack, and Fig. 16 is a fragmentary view of the drum mounting.

Referring to the details of the drawing, 14 represents the floor sections, each composed of several planks arranged transversely of the conveyer. Equal in width to the floor sections, and arranged perpendicular to them near their ends, are the side boards $14^a$ which may be of any suitable height. The conveyer as a whole, is preferably divided into boxes or bodies by the end-boards $14^b$. The side and end boards are secured to and braced from the floor by braces $14^c$ (see Fig. 8), but not secured to each other. Secured to the under side of the floor planks are common strap-hinges $14^d$ arranged with their knuckles coinciding with the joints between the planks. These hinges serve as a track for wheels 15 which are mounted in the standards $15^a$, and also support the boxes when in their upright position. In their inverted position the boxes are supported by wheels 18 which track upon that part of the floor planks which extend beyond the side boards (see Fig. 8). It will be seen that the floor, sides and ends which form each box have no rigid nor positive connection with the supporting framework of the apparatus but merely rest upon the two series of wheels 15 and 18 in such manner as to permit the bodies or boxes to be easily moved longitudinally of the apparatus. This motion is imparted to the conveyer through the rack 6 shown in Figs. 6, $6^a$, 7, 14 and 15, which is secured to the under side of the floor of each section midway its sides, forming an endless chain which extends over the drums 16 at the ends of the conveyer and the gear-wheel $17^c$ (Fig. 2). These drums 16 have projecting teeth which mesh with the racks 6 whereby the rotation of the drums causes the floor to traverse the apparatus like an endless belt. The racks are jointed together as shown in Figs. $6^a$, 7, &c.

Keyed to the same shaft on which one of the drums is fixed, is a drive-wheel 17 which, as shown, is turned by the crank $17^a$ and pinion $17^b$, but may be driven in any one of a number of ways or by any suitable power, the essential feature being that the motion of wheel 17 causes drum 16 to rotate, and this in turn imparts motion to the conveyer. If the length of the conveyer is great enough to require it, a driving wheel may be mounted on one of the intermediate sections, as $17^c$, Fig. 2.

Instead of being pressed or shrunk on to the axles 19 in the usual manner, the wheels 21 are preferably held in place by means of a set screw $21^a$ passing through the hub of one wheel and through a collar $21^b$ on the axle adjacent to the other wheel whereby the position of the wheels on the axle may be adjusted to the gage of the track on which the apparatus is used.

To simplify the construction of the trucks, and to leave an unobstructed passageway for the inverted boxes, long axles are used, extending the full width of the apparatus and their journal-boxes 20 are placed at their extremities as shown in Fig. 8. Standing upon the journal boxes are posts 22 which carry the main cross-timbers 23. Each cross-timber of a section supports the rear end of the longitudinal timbers 24, the other end of the latter resting on the rear cross timber of the section next ahead, when the sections are coupled up, and is without support when they are uncoupled. Near their unsupported ends, the longitudinal timbers 24 of each section are connected together by a cross-timber $23^a$ extending the full width of the section. Between the extremities of these timbers $23^a$ and a pair of lugs $20^a$ which form a part of the journal box, are longitudinal and inclined trusses or timbers 25, so constructed as to withstand either tensile or compressive stress.

The longitudinal beams 24 have secured thereto a series of standards $15^a$ in which wheels 15 are journaled, while the wheels 18 are journaled in brackets $18^a$ secured to the side timbers $24^a$ which extend longitudinally of the sections and are secured at one end to the posts 22 and at the other end, to the posts $22^a$. Both posts 22 and $22^a$ are braced from their respective cross-timbers (23 and $23^a$) by braces $22^b$, and the connection between 22 and 23 may be strengthened in any approved manner.

The method of coupling the sections together and of resting the frame of one upon the frame of the other is shown in detail, in Figs. 11, 12, and 13. In order that the conveyer may not be unduly stretched by the passing of the apparatus over a hill, it is necessary that the distance between the drum centers, measured along a line lying midway between the two floors, shall be always constant. This is accomplished by placing the couplings $11^a$ midway between the two floors. This position of the couplings is shown in Figs. 5, 9 and 10. The couplings $11^a$ bear none of the weight of the sections, the whole weight being carried on the longitudinal beams 24 of one section and the cross beams 23 of the section ahead. When the conveyer is drawn around a curve the side beams slide freely on each other where they lap. To reduce the friction at this point rollers 13ª are provided on the end of the beam 24, see Figs. 11 and 13.

As a means of connecting the braces 25 of the tightener section and the adjacent section, I provide bolts 23ᵇ which engage suitably threaded openings in plates secured to the ends of said braces, pass through the cross-beams 23ª, and are supplied with nuts, as shown in Figs. 3 and 4, whereby the conveyer formed by the several sections may be tightened or loosened as required. Between the ends of the sections, the racks are formed in two sections having a knuckle joint therebetween as shown at 6ᵇ in Figs. 7, 14 and 15.

The rack-plates 6 are pivotally connected at their ends, and intermediate their ends are secured to the under side of the floor sections 14 by lugs 6ª as shown in Fig. 6ª.

A coupling of simple form as 11ª connects the end cross timbers 11ᵇ, 11ᶜ, as shown in Fig. 12.

To maintain the floor sections stretched irrespective of the relative positions of the drums 16, I mount the drum shafts at the ends of the conveyer in slots 28 in the ends of the longitudinal timbers 24, and on the shaft I fix cams 26, the periphery of which is in frictional engagement with idler wheels 27 mounted on studs extending from the timbers 24, as clearly shown in Fig. 16.

What I claim, is:—

1. In conveying and dumping apparatus, a series of connected frames each frame supported in part on a wheeled-truck secured thereto, and in part by the frame next in advance thereof, means for flexibly coupling said frames together, and independent means for supporting the forward end of the front frame of the series.

2. In a conveying and dumping apparatus, a series of connected frames, each consisting of side, vertical and cross timbers rigidly connected and suitably braced, the forward portion of each frame adapted to be supported by the rear portion of the frame adjacent thereto, wheeled trucks supporting the rear portion of said frames, means for flexibly coupling said frames together, an endless conveyer mounted to travel on said frames, and means for driving said conveyers.

3. In a conveying and dumping apparatus, a series of connected frames each consisting of side, vertical and cross-timbers rigidly connected and suitably braced, the forward end of each frame adapted to be flexibly and slidably supported by the rear portion of the adjacent forward frame, trucks supporting the rear portions of said frames, an endless sectional conveyer arranged to travel on said frames, means on said frames for anti-frictionally supporting said conveyer sections in their upright and in their inverted positions, and means for driving said conveyers.

4. In conveying and dumping apparatus, a conveyer section or unit, consisting of a frame composed of side timbers, front and rear cross-timbers, and front and rear uprights suitably connected and braced, means connecting the forward cross-timber with the lower end of the rear uprights, a box composed of side, bottom and end plank suitably connected and braced, and means mounted on said frame and adapted to anti-frictionally support said box when in upright and inverted positions.

5. In conveying and dumping apparatus, a series of connected frames, each composed of side, and cross-timbers and uprights rigidly connected and suitably braced, trucks supporting the rear portion of each frame, braces connecting said trucks with the forward cross-timbers, and means for taking up the stretch in said conveyer apparatus.

6. In a conveying and dumping apparatus, a series of conveyer frames, each frame being adapted to be supported at one end by the adjacent frame, trucks under the frames, an endless carrier arranged to travel upon said series of frames, triangular drums mounted upon said frames and adapted to operatively engage said carrier, and means for adjusting said drums to regulate the tension of the endless carrier.

7. In a conveying and dumping apparatus, a series of conveyer frames, each frame being adapted to be supported at one end upon the adjacent frame, a truck arranged beneath each frame, an endless carrier arranged to travel upon said series of frames, triangular drums mounted upon said frames and adapted to operatively engage said carrier, and means for adjusting said drums to regulate the tension of the carrier, relatively to the positions of the said drums, said adjusting means comprising cams mounted upon the shafts of the drums and operatively engaging abutments upon relatively fixed members.

8. In a conveying and dumping apparatus, a series of conveyer frames flexibly connected and adapted to travel upon a suitable track, an endless carrier mounted upon said conveyer frames and moving bodily therewith, said carrier having a movement independent of the travel of said connected frames, triangular drums operatively engaging said carrier, and means for adjusting said drums to regulate the tension of said carrier, said adjusting means comprising cams mounted upon the drum shafts and engaging idler wheels upon relatively fixed members.

9. In a conveying and dumping apparatus including an endless carrier, a prismoidal rotary member, means on said member for engaging said carrier, and means for adjusting the rotary member longitudinally, said adjusting means including cams, and abutments on said frame engaging the cams.

In testimony whereof I affix my signature in the presence of two witnesses.

PATRICK R. BANNON.

Witnesses:
WM. B. MOORE,
ROBERT J. BANNON.

Copies of this patent may be obtained for five cents each, by addressing the "Commissioner of Patents, Washington, D. C."